US012243384B2

(12) United States Patent
Higgins et al.

(10) Patent No.: US 12,243,384 B2
(45) Date of Patent: Mar. 4, 2025

(54) RETROFIT CARD READER WITH CARDLESS SUPPORT

(71) Applicant: IGT, Las Vegas, NV (US)

(72) Inventors: Kevin Higgins, Reno, NV (US); Erik Petersen, Reno, NV (US)

(73) Assignee: IGT, Las Vegas, NV (US)

( * ) Notice: Subject to any disclaimer, the term of this patent is extended or adjusted under 35 U.S.C. 154(b) by 482 days.

(21) Appl. No.: 17/379,587

(22) Filed: Jul. 19, 2021

(65) Prior Publication Data

US 2021/0343112 A1    Nov. 4, 2021

Related U.S. Application Data

(63) Continuation of application No. 16/589,630, filed on Oct. 1, 2019, now Pat. No. 11,069,186.

(51) Int. Cl.
*G07F 17/00* (2006.01)
*G06K 7/10* (2006.01)
*G07F 17/32* (2006.01)

(52) U.S. Cl.
CPC ..... *G07F 17/3239* (2013.01); *G06K 7/10366* (2013.01)

(58) Field of Classification Search
None
See application file for complete search history.

(56) References Cited

U.S. PATENT DOCUMENTS

| 6,685,567 | B2* | 2/2004 | Cockerille | G07F 17/32 463/16 |
| 8,147,334 | B2 | 4/2012 | Gatto et al. | |
| 8,613,668 | B2 | 12/2013 | Nelson et al. | |
| 8,764,566 | B2 | 7/2014 | Miltenberger et al. | |
| 11,069,186 | B2 | 7/2021 | Higgins et al. | |
| 2003/0115102 | A1* | 6/2003 | Mothwurf | G06Q 30/0235 705/14.27 |
| 2004/0048658 | A1 | 3/2004 | Sanders | |
| 2009/0005176 | A1* | 1/2009 | Morrow | G07F 17/3239 463/43 |
| 2009/0111562 | A1* | 4/2009 | Chudd | G07D 7/003 463/20 |

(Continued)

OTHER PUBLICATIONS

Official Action for U.S. Appl. No. 16/589,630 12 pages.
Notice of Allowance for U.S. Appl. No. 16/589,630, dated Mar. 23, 2021 5 pages.

*Primary Examiner* — Paul A D'Agostino
(74) *Attorney, Agent, or Firm* — Sheridan Ross P.C.

(57) ABSTRACT

The present disclosure relates generally to gaming machines, retrofit card readers for gaming machines, and methods of operating gaming machines and retrofit card readers. As an example, a method is disclosed that includes receiving an indication that a wireless communication module has wirelessly communicated with a player credential, synthesizing a state change that emulates a physical card insertion event in response to receiving the indication that the wireless communication module has wirelessly communicated with the player credential, and communicating the synthesized state change to a Slot Machine Interface Board (SMIB). The synthesized state change may be communicated with a set of electrical signals that include a card detection state and data read from the player credential.

20 Claims, 10 Drawing Sheets

(56) References Cited

U.S. PATENT DOCUMENTS

| | | | |
|---|---|---|---|
| 2009/0117976 A1* | 5/2009 | Tsukahara | G07F 17/32 463/20 |
| 2010/0124983 A1* | 5/2010 | Gowin | G07F 17/3223 463/40 |
| 2011/0215921 A1* | 9/2011 | Ben Ayed | G08B 1/08 340/539.11 |
| 2012/0122585 A1 | 5/2012 | Nguyen | |
| 2012/0134282 A1* | 5/2012 | Tirronen | H04W 4/70 370/252 |
| 2012/0142403 A1 | 6/2012 | Prather et al. | |
| 2012/0214577 A1* | 8/2012 | Petersen | G06F 21/00 463/25 |
| 2013/0065668 A1 | 3/2013 | LeMay et al. | |
| 2013/0065678 A1 | 3/2013 | Nelson et al. | |
| 2014/0087849 A1 | 3/2014 | Page et al. | |
| 2014/0189808 A1* | 7/2014 | Mahaffey | G06F 21/31 726/4 |
| 2014/0229387 A1* | 8/2014 | Chow | G06Q 20/3829 705/71 |
| 2015/0120551 A1* | 4/2015 | Jung | G06Q 20/389 705/44 |
| 2015/0187177 A1 | 7/2015 | Warner et al. | |
| 2015/0287289 A1* | 10/2015 | Lewis | G07F 19/2055 235/379 |
| 2015/0317552 A1 | 11/2015 | Ishida et al. | |
| 2015/0339888 A1* | 11/2015 | Hong | G07F 17/3251 463/25 |
| 2016/0093142 A1 | 3/2016 | Lamb et al. | |
| 2016/0112982 A1* | 4/2016 | Babineau | H04W 64/00 455/456.1 |
| 2017/0055190 A1* | 2/2017 | Takano | H01Q 3/2605 |
| 2017/0092054 A1* | 3/2017 | Petersen | G07F 17/3251 |
| 2017/0092059 A1* | 3/2017 | Nelson | G07F 17/3223 |
| 2017/0120147 A1 | 5/2017 | Thoppil | |
| 2017/0148269 A1 | 5/2017 | Page et al. | |
| 2017/0272824 A1* | 9/2017 | Bunner | H04N 21/8586 |
| 2018/0033244 A1 | 2/2018 | Northrup | G08G 1/0175 |
| 2018/0047249 A1* | 2/2018 | Nelson | G07F 17/3209 |
| 2018/0053194 A1* | 2/2018 | Bond | G07F 17/3223 |
| 2018/0061179 A1* | 3/2018 | Miri | G07F 17/3244 |
| 2018/0085667 A1 | 3/2018 | Tsutsui | |
| 2018/0089940 A1* | 3/2018 | Petersen | G07F 17/3241 |

\* cited by examiner

RETROFIT CARD READER WITH CARDLESS SUPPORT

CROSS REFERENCE TO RELATED APPLICATION

The present application is a continuation of U.S. patent application Ser. No. 16/589,630, filed Oct. 1, 2019, the entire disclosure of which is hereby incorporated by reference.

BACKGROUND

The present disclosure is generally directed to gaming machines and, in particular, toward retrofit readers for gaming machines.

Gaming machines which provide players awards for obtaining winning symbol combinations in plays of primary or base games are well known. Such gaming machines generally require the player to place or make a primary or base wager to activate the primary or base game.

Many known gaming machines are also in communication with a player loyalty or player tracking system configured to track such game play and other player activities. Specifically, a gaming establishment operator will employ one manufacturer's player tracking system in a gaming establishment and install (or cause to be installed) the player tracking units of that manufacturer's player tracking system in the different gaming machines manufactured by the different gaming machine manufacturers at that gaming establishment. In operation of these player tracking systems, player identification information is stored in association with a created player account and a physical credential, such as a card, is issued to the player. The physical credential is associated with the created player account and can be utilized during various activities within a gaming establishment to associate certain activities with a particular player. For example, a player can insert a magstripe player tracking card into a card reader of the player tracking unit associated with a gaming machine to have a record of the player's gaming activity on the gaming machine stored to the account associated with the player tracking card. Such a player tracking unit may also include a player tracking processor configured to track the player's gaming activity and report such gaming activity to a gaming establishment management system which operates with one or more servers, such as one or more accounting servers, and player tracking system servers. Such a player tracking unit may also include one or more of: a display device to display the player's name and balance of player tracking points, one or more input devices, such as a touch screen or keypad to enable the player to enter a Personal Identification Number, and an interface connected to a Slot Machine Interface Board (SMIB). Based on the player's gaming activities, such as an amount wagered, the gaming establishment may offer the player certain "comps" (e.g., complimentary offers), such as free or discounted services and/or the player may be awarded points that can be later redeemed for goods, services, or free play. In addition, the gaming establishment may mine and analyze the information gathered from the loyalty program to identify demographic information and behavioral patterns of their customers. This analysis can then be used to expand and personalize the complimentary offers provided to players.

The utilization of gaming machines with player tracking units enhances certain player loyalty via facilitating that complementary offers are provided to certain players. Additionally, since different gaming establishments may each maintain a distinct player tracking account for a player (and thus may provide a distinct player tracking card to the player), players that frequent a plurality of different gaming establishments may need to carry a plurality of different player tracking cards with them.

Moreover, while certain gaming establishment management systems provide player tracking functionality (via the player tracking units) and accounting functionality (via metering data communicated from the gaming machine), certain other gaming establishment management systems provide additional functionality such as bonusing functionality and/or progressive award functionality. Since gaming establishment management systems are relatively expensive and time consuming to replace (and thus associated with the requisite gaming machine downtime during such replacement), gaming establishments are reluctant to replace previously installed gaming establishment management systems despite such gaming establishment management systems lacking certain functionality (e.g., bonusing functionality and/or progressive award functionality) which certain players prefer.

BRIEF SUMMARY

In certain embodiments, the present disclosure relates to a retrofit card reader for a gaming machine, a gaming machine, and a method. In some embodiments, a retrofit card reader is provided, comprising: a first port that interfaces with a wireless communication module; a second port that interfaces with a Slot Machine Interface Board (SMIB); a processor coupled with the first port and the second port; and a computer-readable storage medium, coupled with the processor and including instructions stored thereon that are executable by the processor, where the instructions include: a set of instructions that receive an electrical signal at the first port indicating the wireless communication module has wirelessly communicated with a player credential; a set of instructions that, in response to receiving the electrical signal at the first port, synthesize a state change that emulates a physical card insertion event; and a set of instructions that makes the synthesized state change available to the SAM via the second port.

In some embodiments, a gaming machine is provided, comprising: a wireless communication module; a Slot Machine Interface Board (SMIB); and a card reader coupling the wireless communication module and the SMIB, where the card reader includes: a processor; and a computer-readable storage medium, coupled with the processor and including instructions stored thereon that are executable by the processor, where the instructions include: a set of instructions that communicates with the wireless communication module and receives an indication that the wireless communication module has wirelessly communicated with a player credential; a set of instructions that synthesizes a state change that emulates a physical card insertion event in response to receiving the indication that the wireless communication module has wirelessly communicated with the player credential; and a set of instructions that makes the synthesized state change available to the SMIB.

In some embodiments, a method is provided, comprising: receiving an indication that a wireless communication module has wirelessly communicated with a player credential; synthesizing a state change that emulates a physical card insertion event in response to receiving the indication that the wireless communication module has wirelessly communicated with the player credential; and communicating the synthesized state change to a Slot Machine Interface Board (SMIB), where the synthesized state change is communicated with a set of electrical signals that include a card detection state and data read from the player credential.

Additional features and advantages are described herein and will be apparent from the following Description and the figures.

DETAILED DESCRIPTION

As can be appreciated, certain gaming establishments are in need of providing additional gaming establishment management system functionality without the associated costs or gaming machine downtime associated with a complete replacement of the existing gaming establishment management system. Furthermore, with more and more players desiring to utilize their mobile device while interacting with a gaming machine, there exists a need to enable gaming machine upgrades without requiring a complete replacement of the gaming machine, replacement of the hardware of the gaming machine, or the gaming establishment management system. Embodiments of the present disclosure will be described in connection with solving these and other issues presented by prior art systems.

It is one aspect of the present disclosure to provide a gaming machine with a retrofit card reader that enables communications between a player's mobile device, or other contactless credential, without significantly interrupting or requiring changes to the native operation of the gaming machine. As an example, the retrofit card reader disclosed herein supports wireless or contactless communications and communicates player card activity to the gaming machine using traditional card-in/card-out messaging. Thus, the native operations of the gaming machine can be left unchanged.

Gaming System

Figure 1:
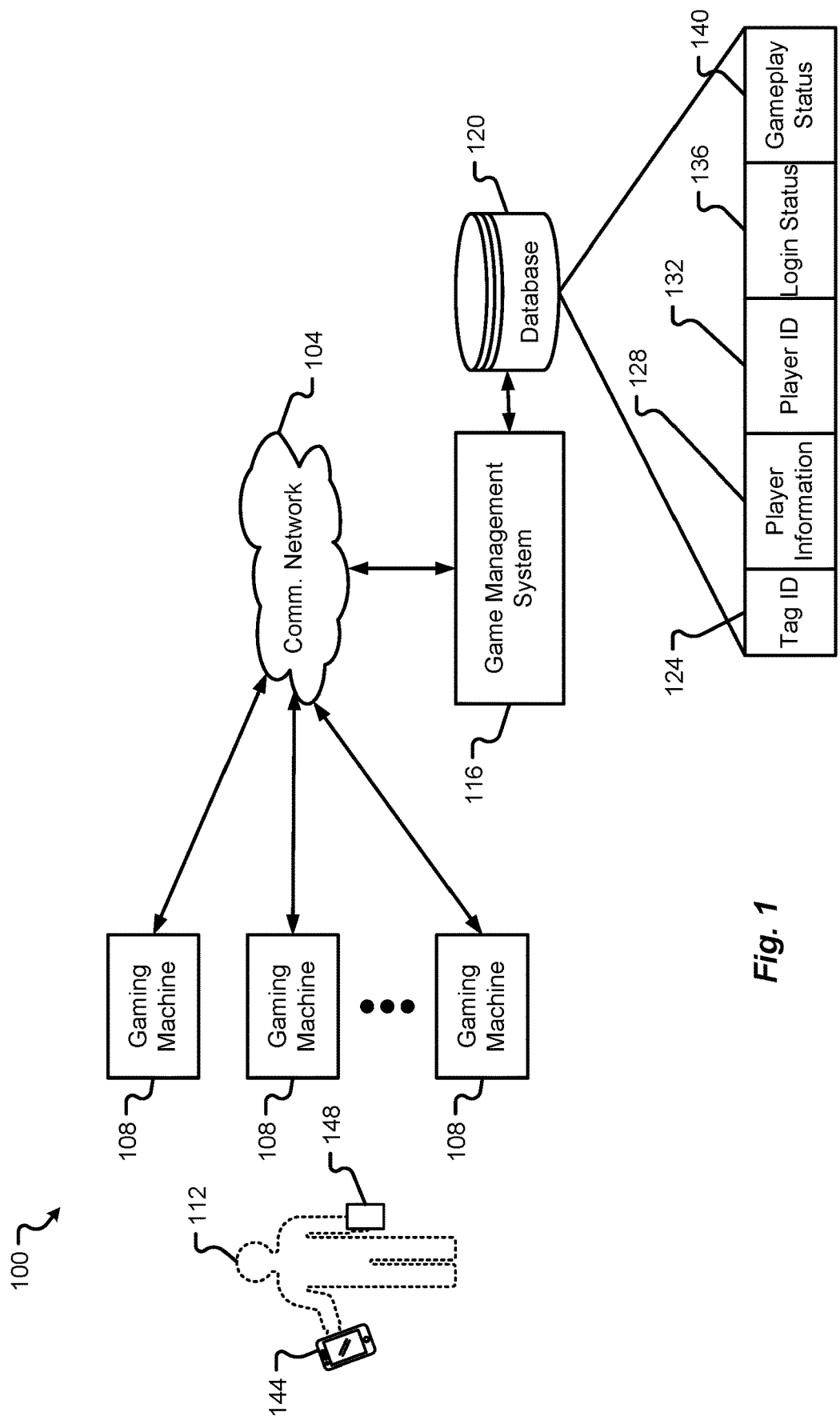
FIG. 1 is a block diagram of a system accordance with embodiments of the present disclosure.

With reference initially to FIG. 1, details of an illustrative gaming system 100 will be described in accordance with at least some embodiments of the present disclosure. The components of the system 100, while depicted as having particular instruction sets and devices, are not necessarily limited to the examples depicted herein. Rather, a system according to embodiments of the present disclosure may include one, some, or all of the components depicted in the system 100 and does not necessarily have to include all of the components in a single device.

The gaming system 100 is shown to include a communication network 104 that interconnects and facilitates machine-to-machine communications between one or multiple gaming machines 108 and one or more game management systems 116. It should be appreciated that a communication network 104 may correspond to one or many communication networks without departing from the scope of the present disclosure. In some embodiments, the gaming machines 108 and game management system 116 may be configured to communicate using various nodes or components of a communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming machines 108 may be distributed throughout a single property or premises (e.g., a single casino floor) or the gaming machines 108 may be distributed among a plurality of different properties. In a situation where the gaming machines 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The various gaming machines 108 may utilize the same or different types of communication protocols to connect with the communication network 104. It should also be appreciated that the gaming machines 108 may or may not present the same type of game or wagering interface to a player 112. For instance, a first gaming machine 108 may correspond to a gaming machine that presents a slot game to the player 112, the second gaming machine 108 may correspond to a sports betting terminal, and other gaming machines 108 may present other types of games or a plurality of different games for selection and eventual play by a player 112. It may be possible for the some of the gaming machines 108 to communicate with one another via a communication network 104.

A gaming machine 108 may correspond to a type of device that enables player 112 interaction in connection with making wagers, communicating, watching live competitive contests, and/or playing games of chance. For instance, the gaming machines 108 may correspond to a type of device that enables a first player 112 to interact with a second player 112 at respective gaming machines 108. In other embodiments, each player 112 may be enabled to play a game individually at a gaming machine 108.

As will be discussed in further detail herein, a player 112 may be allowed to carry a mobile communication device 144 and/or a card 148. Although the player 112 is depicted as carrying two physically separate devices 144, 148, it should be appreciated that the player 112 may carry a single device that includes functionality of both a mobile communication device 144 and card 148. For instance, a mobile communication device 144 may be configured to emulate or present data via a contactless communication protocol (e.g., Near Field Communication (NFC) protocol, Bluetooth®, and/or BLE). Thus, the mobile device 144 may be configured to interact with a gaming machine 108 in a number of different ways. Furthermore, the nature of the card 148 may vary depending upon a number of system considerations. The card 148 may correspond to a contact-based card (e.g., magstripe card, chip card, etc.), a contactless card (e.g., a card that can be read using NFC, Radio Frequency Identification (RFID) protocols, Bluetooth®, BLE, etc.). The card 148 may alternatively or additionally take on other form factors such as a key fob, an NFC sticker attached to a mobile communication device 144, an NFC sticker attached to another card, etc.

Presentation of a mobile communication device 144 and/or card 148 to a gaming machine 108 may enable the player 112 to login or register their presence at a particular gaming machine 108 with respect to a game management system 116. In some embodiments, a player 112 may login to the game management system 116 by presenting the mobile communication device 144 to a gaming machine 108 (e.g., by bringing the mobile communication device 144 within a predetermined distance of the gaming machine 108 so as to enable wireless communications between the gaming machine 108 and mobile communication device 144), which causes components of the gaming machine 108 to initiate a login process with the game management system 116 on behalf of the player 112. Similarly, the player 112 may login to the game management system 116 by inserting or swiping their card 148 into the gaming machine 108, which causes components of the gaming machine 108 to initiate a login process with the game management system 116 on behalf of the player 112. Additional aspects of the login process and components of the gaming machine 108 that facilitate a login process with a game management system 116 will be described in further detail herein.

In some embodiments, the game management system 116 may correspond to a system used within a casino to manage slot games, video poker games, bingo games, keno games, or the like that are played on one or more of the gaming machines 108. In some embodiments, the game management system 116 may correspond to a system used within the casino to manage sports wagers placed by players 112 either at a sports desk or at a gaming machine 108. Although not depicted, it should be appreciated that the game management system 116 may include one or multiple servers that execute instructions in connection with managing the games or wager capabilities made available at the gaming machines 108. The act of logging in to the game management system 116 may enable the player 112 to receive additional playing benefits (e.g., loyalty benefits, progressive benefits, compensation benefits, etc.), maintain or track wager activity, purchase additional wager or gameplay credits, and the like.

As shown in FIG. 1, the game management system 116 may utilize one or more databases 120 to track player 112 activity with respect to the gaming machine(s) 108. For instance, if the game management system 116 implements a player tracking system, then games played at the gaming machines 108, credits wagered in a slot game, credits won in a slot game, etc. may correspond to the types of player 112 activities tracked by the game management system 116. Alternatively or additionally, the game management system 116 may utilize the database 120 to track player 112 activity with respect to sports wagers placed at the gaming machine 108. For instance, the player 112, after logging into the game management system 116, may be allowed to track wagers placed on sporting events, results of wagers placed, and/or watch live broadcasts of events. The database 120 may be used to store records for player 112 activity with respect to the designated game management system 116.

The illustrative database 120 is shown to include data fields used to track player 112 activity with respect to games of chance played at a gaming machine 108. The illustrative, but non-limiting, data fields may include a tag ID field 124, a player information field 128, a player ID field 132, a login status field 136, and a gameplay status field 140. The tag ID field 124 may correspond to a field used to store an identification number or string that uniquely identifies a mobile communication device 144 carried by the player 112 from among other mobile communication devices used by other players. Alternatively or additionally, the tag ID field 124 may be used to store an identification number or string that uniquely identifies a card 148, such as a loyalty card that has been distributed to the player 112. The format of the identification number or string used to uniquely identify the mobile communication device 144 and/or card 148 may be specific to the game management system 116 and can correspond to any alphanumeric sequence or any length (e.g., 1 bit, 2 bits, . . . N bits).

The player information field 128 may be used to store information describing a player 112 with respect to the game management system 116. For instance, the player information field 128 may be used to store information describing whether or not the player 112 has a loyalty status with a particular casino, whether the player 112 is a VIP within the casino, historical gameplay information for the player 112 (e.g., casino visit times, durations, winnings, losses, etc.). In some embodiments, the information maintained in the player information field 128 may be unique to particular games played by the player 112 at gaming machines 108 and may describe the types of games historically played by the player 112.

The player ID field 132 may be used to store an identification number or string that uniquely identifies the player 112 from among other players. As an example, the player ID field 132 may store a player loyalty identification number and may have a particular format associated therewith (e.g., a required length, a number of bits, permissible symbols, etc.) In some embodiments, the player ID assigned to a player 112 may be uniquely assigned by a casino that administers the game management system 116.

The login status field 136 may be used to store a current status of player 112 login with respect to the game management system 116. For instance, the login status field 136 may indicate whether or not a player 112 is currently logged in and, if the player 112 is currently logged in, an identification of the gaming machine 108 at which the player 112 is currently logged in. The login status field 136 may also be used to store historical login information for the player 112 with respect to the game management system 116. In a more specific, but non-limiting example, the login status field 136 may store a card-in or card-out state for a gaming machine 108 and player 112 pair. For instance, the login status field 136 may be used to store a card-in state when the player 112 either presents their mobile communication device 144 or inserts their card 148 to a card reader of the gaming machine 108. Likewise, the login status field 136 may be used to store a card-out state when the player 112 removes their card 148 or walks away from a gaming machine 108, thereby ending their gaming session with the gaming machine 108.

The gameplay status field 140 may be used to store information describing a player's 112 gameplay status at a gaming machine 108. For instance, the gameplay status field 140 may store information describing wager history, credit in information, credit out information, duration of a gaming session with a particular gaming machine 108, and other information that is known to be tracked by the first game management system 116. In embodiments where the game management system 116 corresponds to a sports wagering system, the gameplay status field 140 may be used to store information describing wagers placed by a player 112, odds on wagers placed by the player 112, whether a wager was placed at a gaming machine 108, whether a winning wager has been paid and, if so, whether the winning wager was paid at a gaming machine 108, and any other information describing sports wagers placed by the player 112.

As mentioned above, a gaming machine 108 may include any type of known device such as a slot machine, a sports wagering terminal, an electronic table game (e.g., video poker), a skill-based game, etc. The gaming machine 108 can be in the form of an EGM, virtual gaming machine, video game gambling machine, etc.

Gaming Machine

Figure 2:
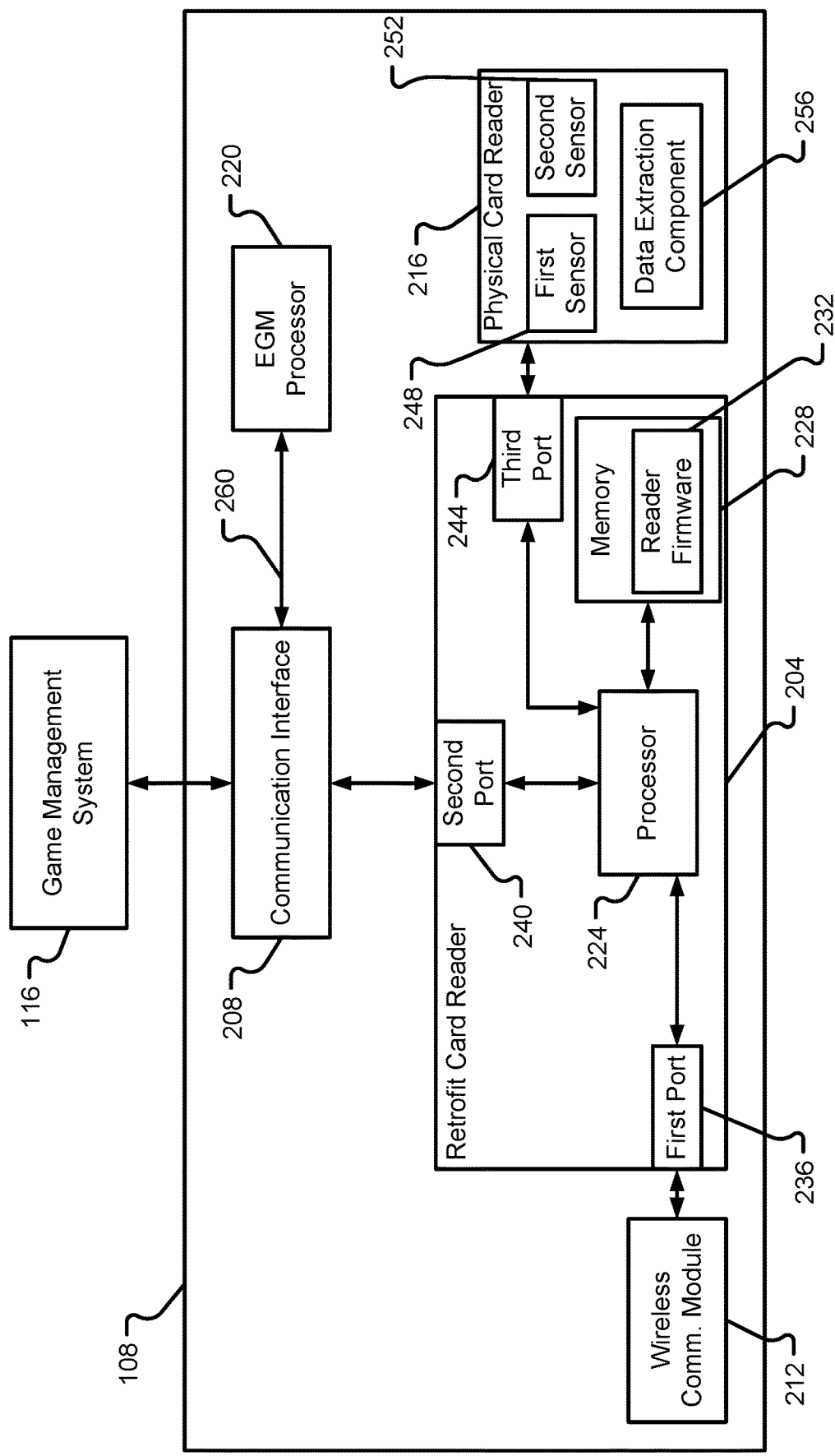
FIG. 2 is a block diagram depicting additional an illustrative system configuration in accordance with embodiments of the present disclosure.
Figure 3:
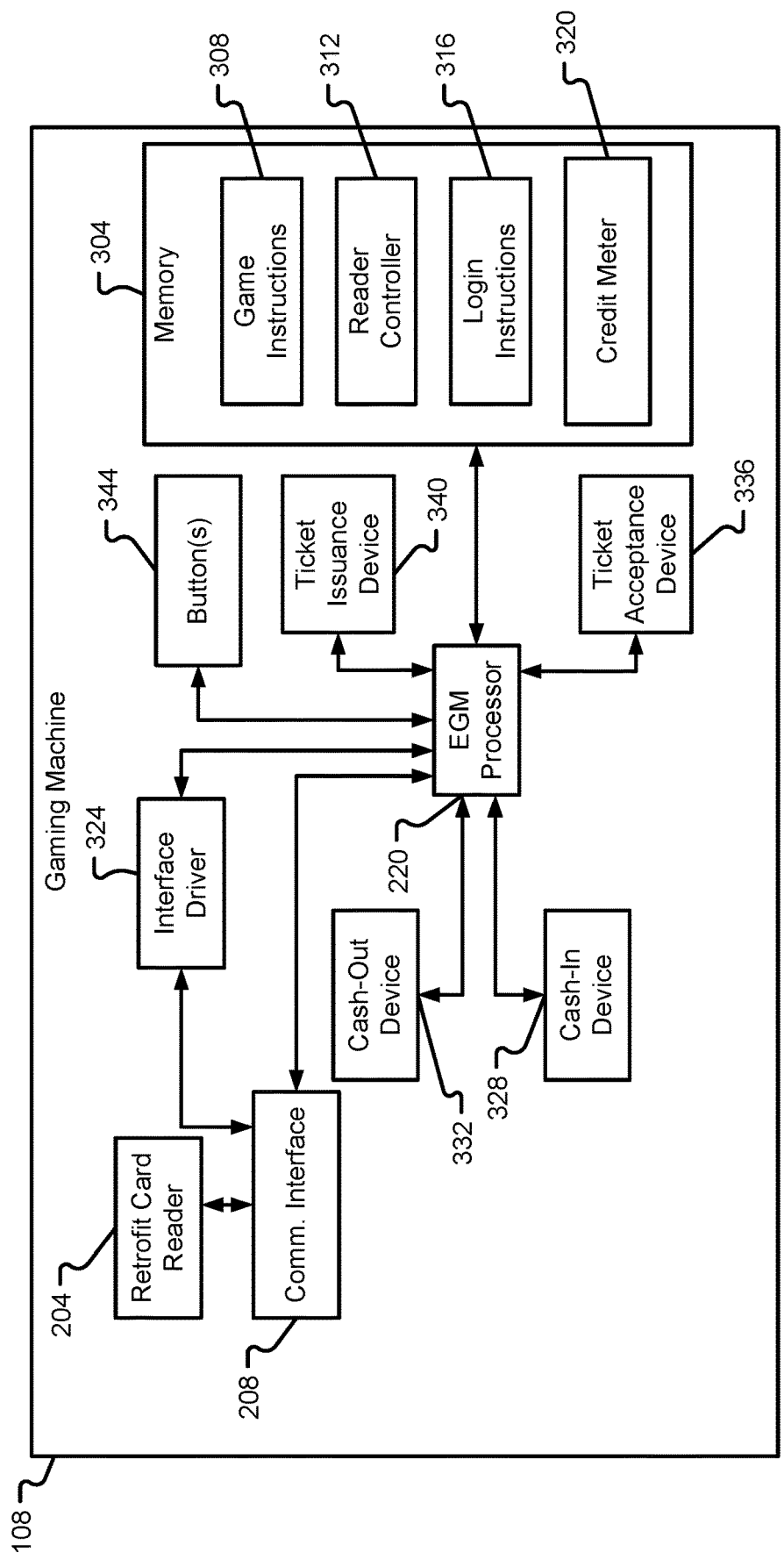
FIG. 3 is a block diagram depicting further details of a gaming machine in accordance with embodiments of the present disclosure.

With reference now to FIGS. 2 and 3, additional details of a gaming machine 108 will be described in accordance with at least some embodiments of the present disclosure. While depicted as a gaming machine 108, it should be appreciated that some or all of the components of a single gaming machine 108 may be distributed across multiple gaming machines 108 (of the same or different type) without departing from the scope of the present disclosure.

The illustrative gaming machine 108 depicted in FIG. 2 is shown to include a retrofit card reader 204, a communication interface 208, a wireless communication module 212, a physical card reader 216, and an Electronic Gaming Machine (EGM) processor 220. In the depicted embodiment, the retrofit card reader 204 is in direct communication with the communication interface 208. In some embodiments, the communication interface 208 may correspond to a component of the gaming machine 108 that has the retrofit card reader 204 integrated therewith. As a more specific but non-limiting example, the communication interface 208 may correspond to a SMIB and the retrofit card reader 204 may be integrated with the SMIB. The communication interface 208 may enable the gaming machine 108 to interact with the game management system 116. Alternatively or additionally, SMIB functionality may be implemented within or by the EGM processor 220. Thus, a "SMIB" as used herein may refer to a traditional SMIB, an EGM processor 220 executing functionality of a SMIB, or any other component or collection of components within the gaming machine 108 to provide capabilities of a SMIB or the communication interface 208 as described herein.

The nature of the communication interface 208 may depend upon the protocol and/or networking requirements of the game management system 116. Examples of a suitable communication interface 208, 216 include, without limitation, an Ethernet port, a USB port, an RS-232 port, an RS-485 port, a NIC, an antenna, a driver circuit, a modulator/demodulator, etc. It should be appreciated that the communication interface 208 may include one or multiple different network interfaces depending upon whether one or multiple network connections are required to facilitate interactions with the game management system 116. For instance, the gaming machine 108 may be provided with both a wired network interface and a wireless network interface without departing from the scope of the present disclosure. In some embodiments, the communication interface 208 may include different communications ports that interconnect with various input/output lines.

The retrofit card reader 204 may be configured to replace a legacy card reader of a gaming machine 108. In some embodiments, the retrofit card reader 204 may be provided with a processor 224, memory 228 having reader firmware 232 stored thereon, a first port 236, a second port 240, and a third port 244. The processor 224 may correspond or include a microprocessor, a CPU, Integrated Circuit (IC) chip, a microcontroller, or the like.

The memory 228 may include any type of known memory device or collection of memory devices. Non-limiting examples of memory 228 may include a Read Only Memory (ROM), Random Access Memory (RAM), Flash memory, an Electronically Erasable Programmable ROM (EEPROM), or any other type of known memory device.

In some embodiments, one, some, or all of the first port 236, second port 240, and third port 244 may correspond to a physical data port, a logical data port, or combinations thereof. A port, as used herein, may correspond to any hardware, software, or combination of hardware and software that enables an electrical signal to be communicated from one computational device to another computational device, which may be on a common circuit board or a different circuit board.

In the depicted embodiment, the first port 236 of the retrofit card reader 204 is used to connect the retrofit card reader 204 with the wireless communication module 212. In some embodiments, the wireless communication module 212 may correspond to an integral part of the retrofit card reader 204 in which case the first port 236 may correspond to a logical data port, bonding wire, and/or electrical trace that is used to carry an electrical signal from an antenna or demodulator of the wireless communication module 212 across a circuit board to the processor 224 of the retrofit card reader 204. In other embodiments, the wireless communication module 212 may be a physically separate device from the retrofit card reader 204, in which case the first port 236 may include a physical data port (e.g., serial data port, parallel data port, USB port, RS-232 port, Wiegand wire, Ethernet port, etc.) that connects the wireless communication module 212 with the retrofit card reader 204.

The second port 240 of the retrofit card reader 204 is used to connect the retrofit card reader 204 with the communication interface 208. In some embodiments, the retrofit card reader 204 and communication interface 208 may be provided on a common circuit board, in which case the second port 240 may correspond to a logical data port, bonding wire, and/or electrical trace that is used to carry electrical signals between the retrofit card reader 204 and communication interface 208. In other embodiments, the communication interface 208 and retrofit card reader 204 may be provided on different circuit boards, in which case the second port 240 may include a physical data port (e.g., serial data port, parallel data port, USB port, RS-232 port, Ethernet port, etc.) that connects the communication interface 208 with the retrofit card reader 204.

The third port 244 of the retrofit card reader 204 is used to connect the retrofit card reader 204 with the physical card reader 216. In some embodiments, the retrofit card reader 204 and physical card reader 216 may be provided on a common circuit board, in which case the third port 244 may correspond to a logical data port, bonding wire, and/or electrical race that is used to carry electrical signals between the retrofit card reader 204 and physical card reader 216. In other embodiments, the physical card reader 216 may be provided on a different circuit board than the retrofit card reader 204, in which case the third port 244 may include a physical port (e.g., serial data port, parallel data port, USB port, RS-232 port, Ethernet port, Wiegand wire, etc.) that connects the physical card reader 216 with the retrofit card reader 204.

As will be discussed in further detail herein, the physical card reader 216 may be configured to accept and read a card 148 carried by a player 112 whereas the wireless communication module 212 may be configured to accept and read a mobile communication device 144 (or contactless card) carried by the player 112. The retrofit card reader 204 is provided as a component that coordinates operations of the wireless communication module 212 and physical card reader 216 and presents inputs from both devices (e.g., inputs received at the first port 236 and third port 244) in a common manner to the communication interface 208. In other words, the retrofit card reader 204 may present inputs from both the wireless communication module 212 and the physical card reader 216 to the communication interface 208 in a common format such that the communication interface 208 is unaware of the wireless communication module 212, but rather believes all inputs received from the retrofit card reader 204 are received from a physical card reader 216.

In some embodiments, the retrofit card reader 204 is provided with the reader firmware 232 to enable the functionality of the retrofit card reader 204 as described herein. More specifically, the reader firmware 232 stored in memory 228 may be executed by the processor 224 to enable the retrofit card reader 204 to process electrical signals from both the wireless communication module 212 and physical card reader 216 and present those electrical signals to the communication interface 208 as if the electrical signals originated from a single device (e.g., the physical card reader 216).

While depicted as firmware, it should be appreciated that the reader firmware 232 can be provided in any suitable format. For instance, the reader firmware 232 may correspond to software or a combination of firmware and software that enable functionality of the retrofit card reader 204 as described herein. In some embodiments, the reader firmware 232 may include one or more instruction sets to enable such functionality. As some non-limiting examples, the reader firmware 232 may include a set of instructions that receive an electrical signal at the first port 236 indicating the wireless communication module 212 has wirelessly communicated with a credential (e.g., mobile communication device 144 or contactless card 148) carried by a player 112. The reader firmware 232 may also include a set of instructions that, in response to receiving the electrical signal at the first port 236, synthesize a state change that emulates a physical card insertion event at the physical card reader 216. The reader firmware 232 may also include a set of instructions that communicate the synthesized state change to the communication interface 208 via the second port 240. The synthesized state change may be proactively communicated to the communication interface 208 via the second port 240 (e.g., the reader firmware 232 may push the synthesized state change to the communication interface). In other embodiments, the synthesized state change may synthesize the state change and make the state change available to the communication interface 208 upon request. In other words, the communication interface 208 may be configured to poll or request the card reader state and there is no "event" proactively generated by the reader firmware 232.

In some embodiments, the set of instructions that synthesizes the state change that emulates the physical card insertion event may simulate an output that would be generated in response to a physical card 148 being successfully inserted at the physical card reader 216. These instructions may, in some embodiments, generate a set of electrical signals for transmission via the second port 240 that include: (i) a card front detection event signal; (ii) a card back detection event signal; and (iii) a card track data signal. In some embodiments, the set of instructions that synthesize the state change may negate the card back detection event signal.

The reader firmware 232 may include additional sets of instructions without departing from the scope of the present disclosure. For instance, the reader firmware 232 may include a set of instructions that monitors for a removal of the player 112 credential from a communication range of the wireless communication module 212 and a set of instructions that, in response to detecting the removal of the player 112 credential from the communication range of the wireless communication module 212, synthesizes a state change that emulates a physical card removal event.

It should be appreciated that the communication range of the wireless communication module 212 may depend upon the communication protocol utilized by the wireless communication module 212. For instance, if the wireless communication module 212 utilizes and RFID or NFC protocol, then the communication range may be on the order of 10 cm or less. However, if the wireless communication module 212 utilizes Bluetooth® or BLE, then the communication range may be on the order of 100 m or less. If the wireless communication module 212 utilizes WiFi, then the communication range may be on the order of 50 m or less. In some embodiments, the reader firmware 232 may be configured to measure a signal strength of a wireless signal (e.g., RSSI) produced by a credential presented by the player 112 to the wireless communication module 212, compare the measured strength of the wireless signal with a threshold strength, and if the measured strength is below the threshold strength, determine that the player credential has moved further away from the wireless communication module 212 than a predetermined distance. In other embodiments, the reader firmware 232 may be configured to determine a Time of Flight (ToF) or physical distance between the player credential and the wireless communication module 212 to determine if the player credential is within a predetermined proximity of the wireless communication module 212 (and therefore within a predetermined proximity of the gaming machine 108).

The reader firmware 232 may also include a set of instructions that instructs the communication interface 208 initiate a player session in response to a card insertion event and then discontinue a player session in response to detecting the removal of the player credential from the communication range of the wireless communication module. The initiation of a player session may also be registered in response to detecting/reading a physical card 148 with the physical card reader 216 and the discontinuation of the player session may be registered in response to detecting that the physical card 148 has been removed from the physical card reader 216. In some embodiments, the electrical signals generated by the retrofit card reader 204 in response to card-out events detected at the physical card reader 216 may be emulated when the wireless communication module 212 loses wireless communication capabilities with a player's 112 mobile communication device 144 and/or contactless card 148.

The physical card reader 212 is shown to include a first sensor 248, a second sensor 252, and a data extraction component 256. In some embodiments, the first sensor 248 may be configured to detect a front end of a physical card 148 when the physical card 148 is completely inserted into a slot of the physical card reader 216. The second sensor 252 may be similar to the first sensor 248, but may be configured to detect a back end of the physical card 148 completely inserted into the slot of the physical card reader 216. The data extraction component 256 may be configured to extract data from the physical card 148 when the physical card 148 is completely inserted into the slot of the physical card reader 216. In some embodiments, the first sensor 248 and/or second sensor 252 may correspond to optical sensors, proximity sensors, contact sensors, or the like that are configured to detect a physical object (e.g., the physical card 148) being inserted or physically presented to the physical card reader 216. The data extraction component 256 may include hardware and/or software configured to read data from the card 148 when the card is inserted or physically presented to the physical card reader 216. Non-limiting examples of the data extraction component 256 include a magstripe reader, a machine vision device (e.g., Infrared scanner with optical recognition capabilities), a contact-based reader, a chip reader, or the like.

FIG. 2 further illustrates that the communication interface 208 may be in communication with a processor of the EGM 220. Specifically, the EGM processor 220 may correspond to a processor outside of the retrofit card reader 204 that is used to control other behaviors or operations of the gaming machine 108 as will be described in further detail herein with reference to FIG. 3. In some embodiments, the communication interface 208 may be configured to communicate data with the EGM processor 220 using a Slot Accounting System (SAS) protocol 260. The communication interface 260 may share with the EGM processor 220 various types of data related to card-in, card-out, and other card read events. In some embodiments, the communication interface 208 may automatically initiate a player login process with the game management system 116 in response to a player 112 presenting a mobile communication device 144 to the wireless communication module 212 and/or in response to the player 112 inserting or presenting a physical card to the physical card reader 216. The login process executed by the communication interface 208 may occur independent of the EGM processor 220 or may include some processing by the EGM processor 220, depending upon the system architecture of the gaming machine 108 and/or requirements of the game management system 116.

With reference now to FIG. 3, additional details of a gaming machine 108 and components provided therein will be described in accordance with at least some embodiments of the present disclosure. The gaming machine 108 is shown to further include memory 304, an interface driver 324, a cash-in device 328, a cash-out device 332, a ticket acceptance device 336, a ticket issuance device 340, and one or more buttons 344.

The EGM processor 220 may include one or multiple computer processing devices. In some embodiments, the EGM processor 220 may include a microprocessor, a CPU, a microcontroller, or the like. The EGM processor 220 may also be configured to execute one or more instruction sets stored in memory 304.

The memory 304 may include one or multiple computer memory devices that are volatile or non-volatile. The memory 304 may be configured to store instruction sets that enable player 112 interaction with the gaming machine 108, that enable the gaming machine 108 to interact with the game management system 116, and that enable the gaming machine 108 to provide a player 112 with the ability to login to the game management system 116. Examples of instruction sets that may be stored in the memory 304 include a game instruction set 308, a reader controller 312, and a game login instruction set 316. While the reader controller 312 is depicted as being provided in memory 304, it should be appreciated that functionality of the reader controller 312 may be provided in whole or in part by the interface driver 324. Thus, the reader controller 312 may be provided in the interface driver 324 without departing from the scope of the present disclosure. The controller 312 can be provided as software instructions, firmware instructions, combinations thereof, or the like.

The game instruction set 308, when executed by the EGM processor 220, may enable the gaming machine 108 to facilitate one or more games of chance or skill and produce interactions between the player 112 and the game of chance or skill. In some embodiments, the game instruction set 308 may include subroutines that present one or more graphics to the player 112 via a user interface, subroutines that calculate whether a particular game wager has resulted in a win or loss during the game of chance or skill, subroutines for determining payouts for the player 112 in the event of a win, subroutines for exchanging communications with the first game management system 116 via the first communication interface 216, and any other subroutine or set of instructions that facilitate gameplay at or in association with the gaming machine 108. Alternatively or additionally, when executed by the EGM processor 220, the game instruction set 308 may enable the gaming machine 108 to present games or information to the player 112 on behalf of the game management system 116. In some embodiments, the game instruction set 308 may include instructions that enable the player 112 to place wagers on sporting events, watch live sporting events via the gaming machine 108, track a status of wagers placed on sporting events, track a status of events occurring in sporting events, and the like.

The reader controller 312, when executed by the EGM processor 220 and/or interface driver 324, may enable functionality of the communication interface 208. Alternatively or additionally, the reader controller 312 may be configured to enable functionality of the retrofit card reader 204 via the communication interface 208. In some embodiments, the reader controller 312 may be configured to control the retrofit card reader 204 to read data from a mobile communication device 144 and/or card 148. In some embodiments, where the retrofit card reader 204 is integrated with the communication interface 208, the interface driver 324 may also be integrated with the communication interface 208. Thus, functionality associated with the retrofit card reader 204, the reader controller 312, and/or the interface driver 324 may be provided in the communication interface 208, in whole or in part.

The game login instruction set 316, when executed by the EGM processor 220 and/or interface driver 324 and/or communication interface 208, may enable the gaming machine 108 to initiate a login process for a player 112 with the game management system 116. In some embodiments, the login process for the game management system 116 may be initiated automatically in response to a card read event occurring at the retrofit card reader 204. Such events may include detecting and reading a mobile communication device 144 and/or card 148 either wirelessly with the wireless communication module 212 and/or with the physical card reader 216. In some embodiments, the login process for the game management system 116 may be initiated in response to registering a card read event at the retrofit card reader 204 via either one of the wireless communication module 212 and physical card reader 216. As mentioned above, embodiments are contemplated where the login process for the game management system 116 is initiated by the communication interface 208 and without any intervention or assistance by the EGM processor 220.

The credit meter 320 may correspond to a device or collection of devices that facilitates a tracking of wager activity or available wager credits at the gaming machine 108. Such credits may be made available for wagers or bets placed on a game managed by the game management system 116. In some embodiments, the credit meter 320 may be used to store or log information related to various player 112 activities and events that occur at the gaming machine 108. The types of information that may be maintained in the credit meter 320 include, without limitation, player information, available credit information, wager amount information, and other types of information that may or may not need to be recorded for purposes of accounting for wagers placed at the gaming machine 108 and payouts made for a player 112 during a game of chance or skill played at the gaming machine 108. In some embodiments, the credit meter 320 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming machine 108, and the like. Some or all of the data within the credit meter 320 may be reported to the first game management system 116 and/or second game management system 124. As an example, the number, value, and timing of wagers placed by a particular player 112 and payouts on such wagers may be reported.

The cash-in device 328 may include a bill acceptor, a coin acceptor, a chip acceptor or reader, or the like. In some embodiments, the cash-in device 328 may also include credit card reader hardware and/or software. The cash-out device 332 may operate and issue cash, coins, tokens, or chips based on an amount indicated within the credit meter 320. In some embodiments, the cash-out device 332 may include a coin tray or the like and counting hardware configured to count and distribute an appropriate amount of coins or tokens based on a player's 112 winnings or available credit within the credit meter 320.

The gaming machine 108 may also be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a physical ticket acceptor, a shredder, etc. The ticket acceptance device 336 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's 112 mobile communication device 144, for example.

The ticket issuance device 340 may be configured to print or provide physical tickets/vouchers to players 112. In some embodiments, the ticket issuance device 340 may be configured to issue a ticket/voucher consistent with an amount of credit available to a player 112, possibly as indicated within the credit meter 320.

The button(s) 344 may correspond to any type of mechanical or software-based input device. In some embodiments, the button(s) 344 may be provided on a common panel or portion of the gaming machine 108 and may be used to initiate a predetermined function in response to being pressed by the player 112. A button 344, as can be appreciated, may alternatively or additionally take the form of one or more depressible buttons, a lever or "one armed bandit handle," etc. A button 344 may include one or more mechanically-actuatable components or may correspond to a predetermined area of a display that is configured to receive a user input.

Device Interactions

Referring now to FIGS. 4-8, various details of device interactions that may occur within the system 100 will be described in accordance with at least some embodiments of the present disclosure. The device interactions are meant to be illustrative of the types of interactions that may occur within a system 100 and should not be construed as limiting embodiments of the present disclosure to any particular one or set of device interactions. Rather, one or more of the interactions described in connection with one figure may be used or applied to interactions described in connection with another figure without departing from the scope of the present disclosure.

Figure 4:
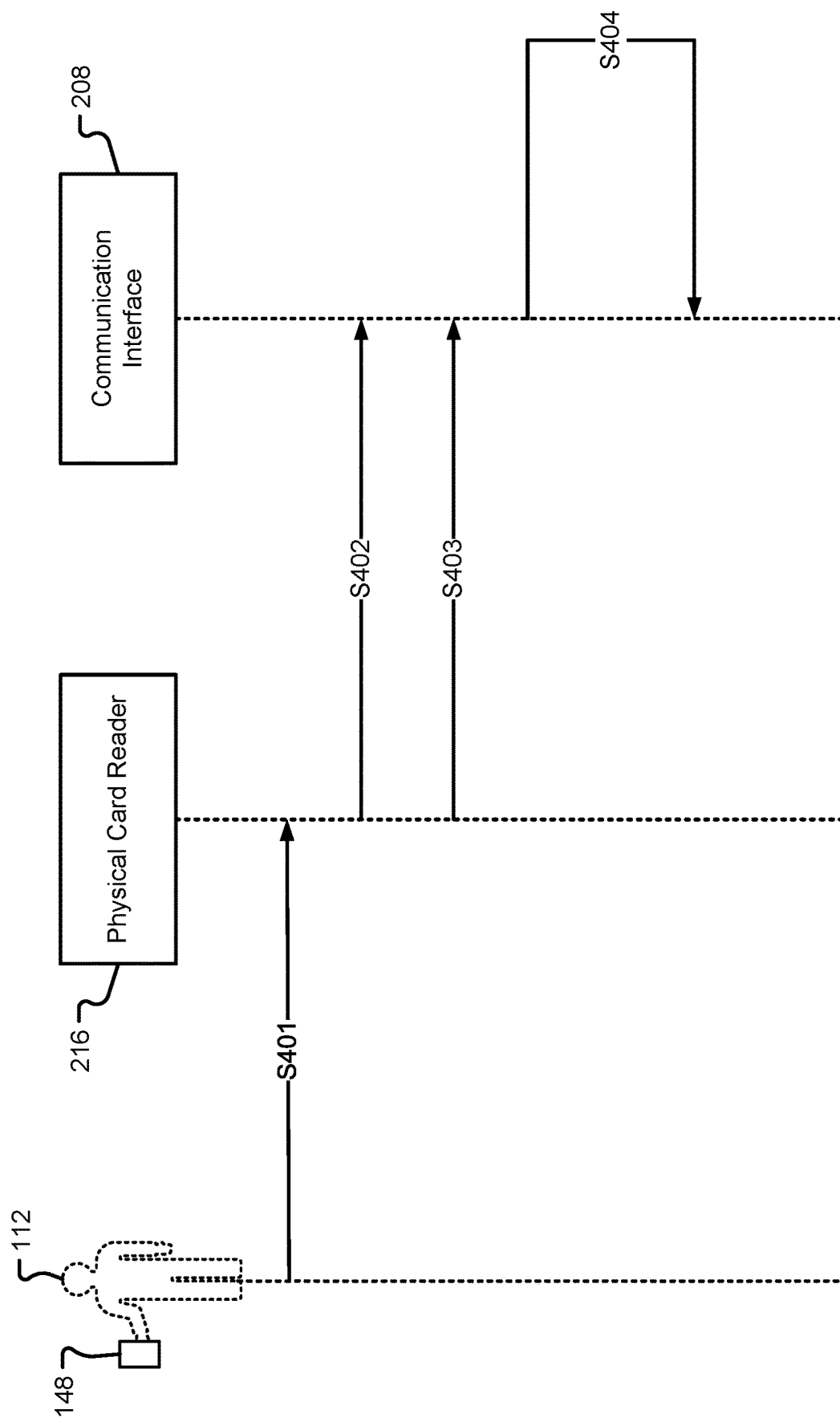
FIG. 4 is a block diagram depicting a first illustrative set of device interactions in accordance with embodiments of the present disclosure.

Referring initially to FIG. 4, a first set of device interactions will be described in accordance with at least some embodiments of the present disclosure. The first set of device interactions correspond to a traditional set of interactions that occur in the system 100 when a player 112 presents a physical card 148 to a physical card reader 216 of a gaming machine 108. The interactions include a first step where the player 112 inserts or physically presents the card 148 to the physical card reader 216 (step S401). In this step, the insertion of the card 148 may be detected with the first sensor 248 and/or second sensor 252. Insertion of the physical card 148 to the physical card reader 216 may cause the physical card reader 216 to initiate a communication with the communication interface 208 that flows through the retrofit card reader 204. Specifically, upon detecting a complete insertion of a physical card 148 into the physical card reader 216, the physical card reader 216 may provide one or more electrical signals to the retrofit card reader 204 that indicate a status of one or more of the first sensor 248 and second sensor 252 (step S402). For instance, the physical card reader 216 may communicate whether or not a card has been physically detected with a single sensor (e.g., a card detection event). As another example, the physical card reader 216 may communicate both a card front detection event and a card back detection event. The card front detection event may describe the status of the first sensor 248 (e.g., card detected or card not detected), with the first sensor 248 being positioned near a front end of a slot of the physical card reader 216. Continuing this example, the card back detection event may describe a status of the second sensor 252 (e.g., card detected or card not detected), with the second sensor 252 being positioned near a back end of the slot of the physical card reader 216.

The physical card reader 216 may also communicate the card data read from the physical card 148 (step S403). The card data read from the physical card 148 may include card data read from a magnetic strip of the card 148, card data read from an IC chip of the card 148, or the like. The card data may be communicated to the communication interface 208 via the retrofit card reader 204. More specifically, both the card read event information (e.g., sensor state information) and the card data may be provided to the retrofit card reader 204 via the third port 244 and then provided to the communication interface 208 via the second port 240 of the retrofit card reader 204.

When the communication interface 208 receives the card state information and card data from the retrofit card reader 204, the communication interface may start the process of validating the card 148 by analyzing the card data to determine if the card data matches an expected data format (step S404). If the card validation step is performed successfully, the communication interface 208 may initiate a player login process with the game management system 116 and/or provide appropriate information to the EGM processor 220 to report the card insertion event.

A card removal event detected at the physical card reader 216 may follow a similar set of process flows. Specifically, if one or both of the sensors 248, 252 no longer detect a physical presence of the card 148 in the physical card reader 148, the card state information may be communicated to the retrofit card reader 204 via the third port 244, which communicates the card removal event to the communication interface 208 via the second port 240. Upon receiving an indication of the card removal event, the communication interface 208 may start the process of ending or discontinuing a player session. Specifically, the communication interface 208 may begin a process of logging the player 112 out of the game management system 116.

Figure 5:
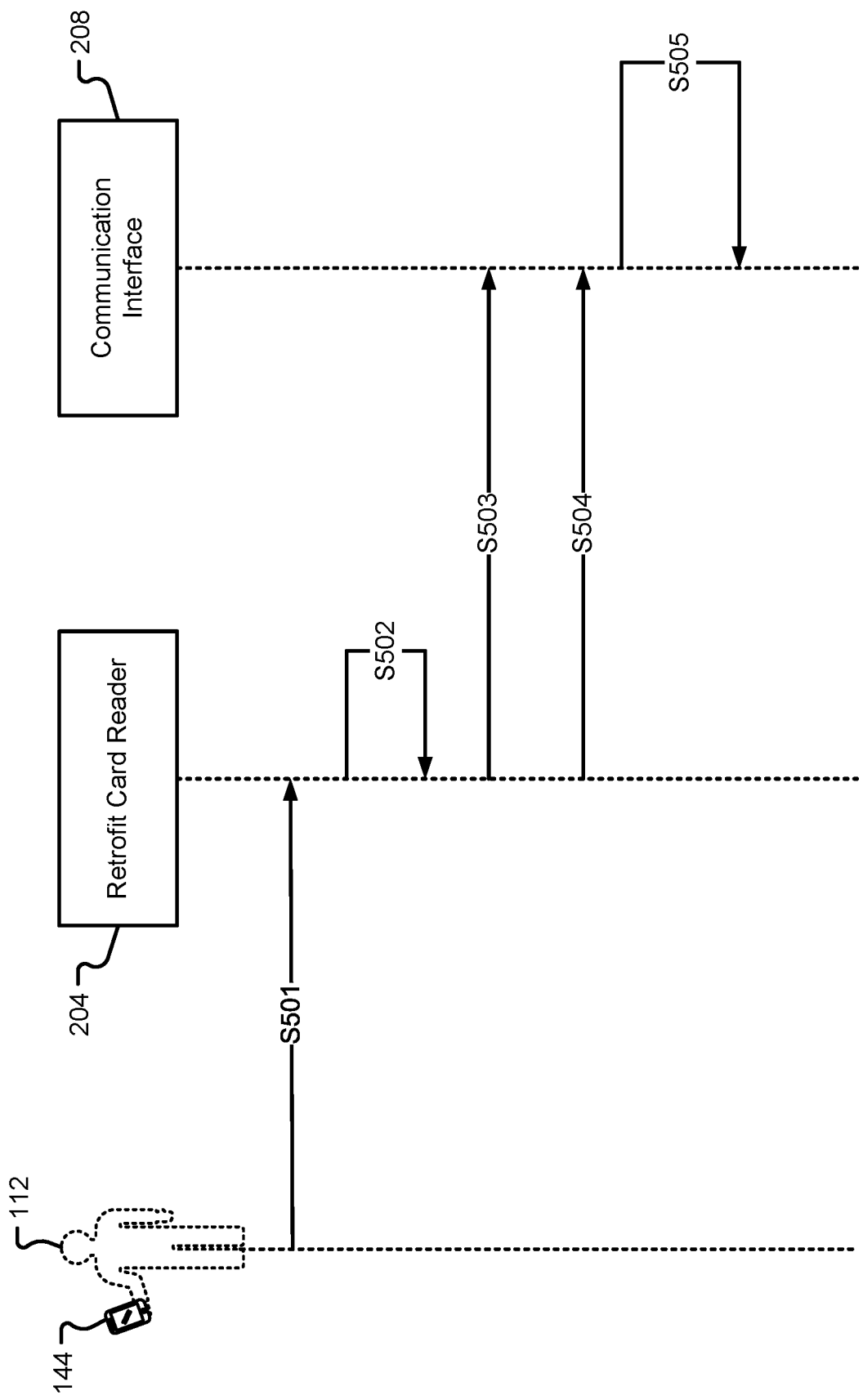
FIG. 5 is a block diagram depicting a second illustrative set of device interactions in accordance with embodiments of the present disclosure.

With reference now to FIG. 5, a second set of possible device interactions will be described in accordance with at least some embodiments of the present disclosure. The interactions begin when a player 112 presents a mobile communication device 144 or contactless card 148 to a wireless communication module 212 of the gaming machine 108. When the player 112 presents a credential to the wireless communication module 212, the wireless communication module 212 may begin reading data from the credential using a wireless or contactless communication protocol. The wireless communication module 212 may then provide one or more electrical signals to the retrofit card reader 204 informing the retrofit card reader 204 of the wireless or contactless card read event at the wireless communication module 212 (step S501). This information may be communicated to the retrofit card reader 204 via the first port 236. This step may also include providing the retrofit card reader 204 with data read from the player credential. For instance, if the credential corresponds to a Bluetooth-enabled device, then the data provided to the retrofit card reader 204 may include any of the data read from the credential using the Bluetooth protocol. Alternatively or additionally, the data may include NFC-formatted data or any other type of data.

In response to receiving the information from the wireless communication module 212, the retrofit card reader 204 may begin the process of converting the information received over the wireless communication channel (e.g., via the wireless communication module 212) to a traditional card activity status message or set of messages (step S502). Specifically, the retrofit card reader 204 may employ the processor 224 and reader firmware 232 to set the wireless front card detect event to true and the wireless rear card detection event to true, with the aim of emulating an output that would otherwise be provided in response to a card read event that occurs at the physical card reader 216.

The retrofit card reader 204 may then report a card front detection event and card rear detection event to the communication interface 208 (step S503). This particular step may be similar to step 5402 and may be facilitated by transmitting one or more electronic signals to the communication interface 208 via the second port 240. Likewise, the retrofit card reader 204 may provide the data read from the card via the wireless or contactless communication protocol to the communication interface 208 (step S504). This particular step may be similar to step 5403 and may be facilitated by transmitting one or more electronic signals to the communication interface 208 via the second port 240.

Thereafter, the communication interface 208 may respond to the information received in steps S503 and S504 similar to the way that the communication interface 208 responded in step 5404. Specifically, the communication interface 208 may respond to the retrofit card reader 204 by initiating the processing of validating the data received from the mobile communication device 144 and/or contactless card 148 (step S505). The communication interface 208, in response to validating the data received from the mobile communication device 144 and/or contactless card 148, may automatically initiate a login process for the player 112 with the game management system 116.

In some embodiments, after a wireless triggered card-in event has occurred (e.g., a contactless credential has been read and validated by the retrofit card reader 204 and communication interface 208), the retrofit card reader 204 may continue reporting a card status of "card inserted" even though the sensors 248, 252 of the physical card reader 216 do not detect an inserted card. In some embodiments, the card status may become a logical OR of the following for a physical card reader 216 having a single sensor: card-in=physical card detected OR wireless card detected. If the physical card reader 216 includes two sensors 248, 252, then the card-in state may be reported when: (a) card front detect=physical card front detected with first sensor 248 OR wireless card detected AND (b) rear card detect=physical card rear detected with second sensor 252 OR wireless card detected.

Figure 6:
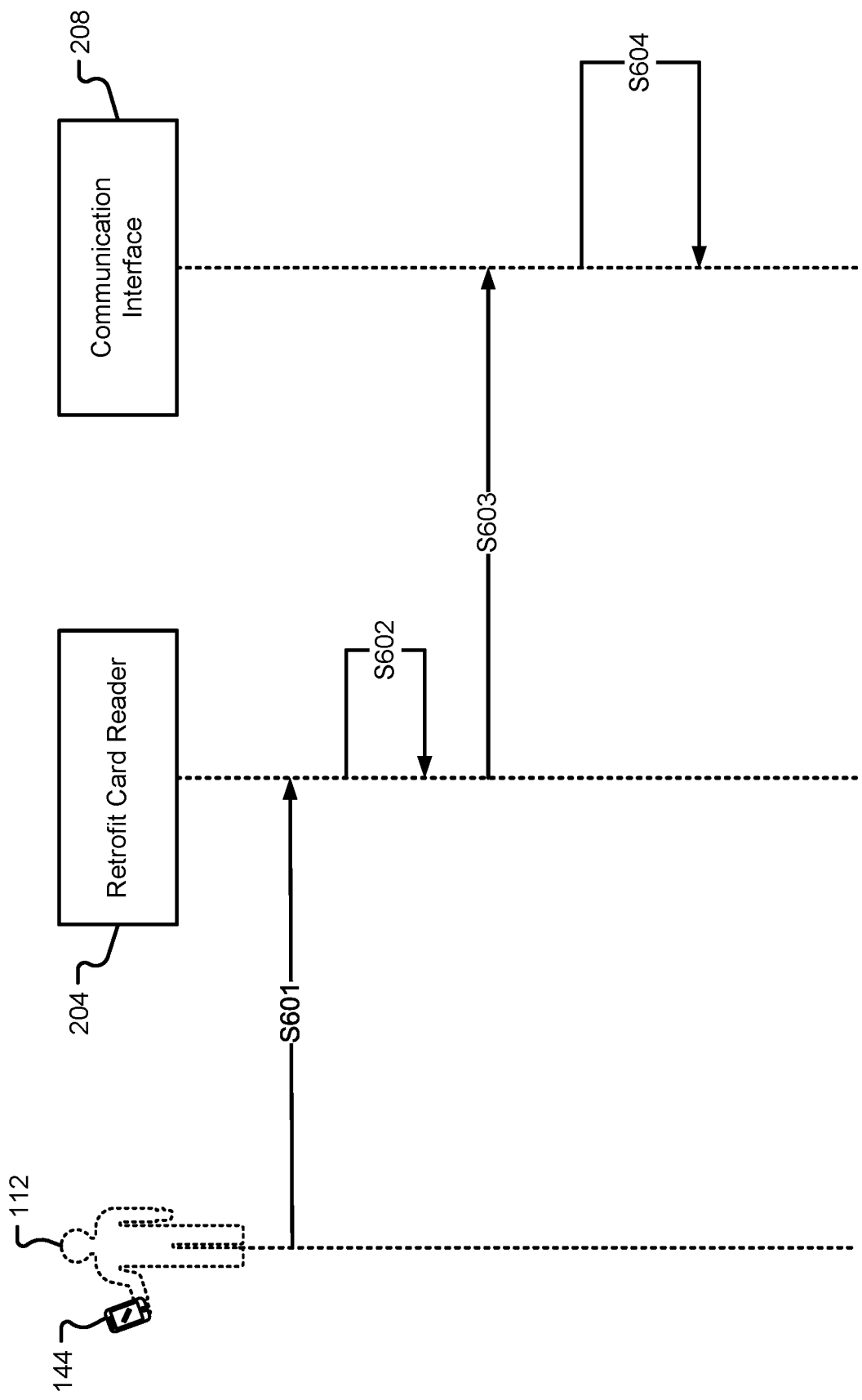
FIG. 6 is a block diagram depicting a third illustrative set of device interactions in accordance with embodiments of the present disclosure.

With reference now to FIG. 6, interactions used to detect and report a wireless card removal event will be described in accordance with at least some embodiments of the present disclosure. The process begins when a player 112 initiates a wireless card-out event. This may be performed when the player 112 taps their mobile communication device 144 to the wireless communication module 212 a second time (e.g., a time after the first tap that resulted in the wireless card-in event). This particular approach may be performed when the mobile communication device 144 is communicating with the wireless communication module 212 using a protocol having a relatively short communication range (e.g., NFC and/or RFID). Alternatively or additionally, if the communication protocol being used comprises a longer communication range than 10 cm or less, then the wireless card-out event may be initiated by the player 112 by either pressing a "card out" button on their mobile communication device 144 or by walking more than a predetermined distance away from the gaming machine 108. Regardless of how the player 112 triggers the wireless card-out event, the wireless communication module 212 may communicate the wireless card-out event to the retrofit card reader 204 (step S601) indicating that the player 112 desires to end their current playing/gaming session. In response to receiving the indication of the wireless card-out event from the wireless communication interface 212, the retrofit card reader 204 may set a card front detect state and/or card back detect state to false, thereby emulating a physical card-out event (step S602). The retrofit card reader 204 may then report the updated card-out event to the communication interface 208 with one or more electrical signals transmitted via the second port 240 (step S603).

Upon receiving the electrical signal(s) from the retrofit card reader 204 indicating the card-out event, the communication interface 208 may initiate discontinuation of the player session with the game management system 116 (step S604). Specifically, the communication interface 208 may report the card-out event to the EGM processor 220 and/or game management system 116, which causes the player 112 to logout of the game management system 116 for the current playing session.

Figure 7:
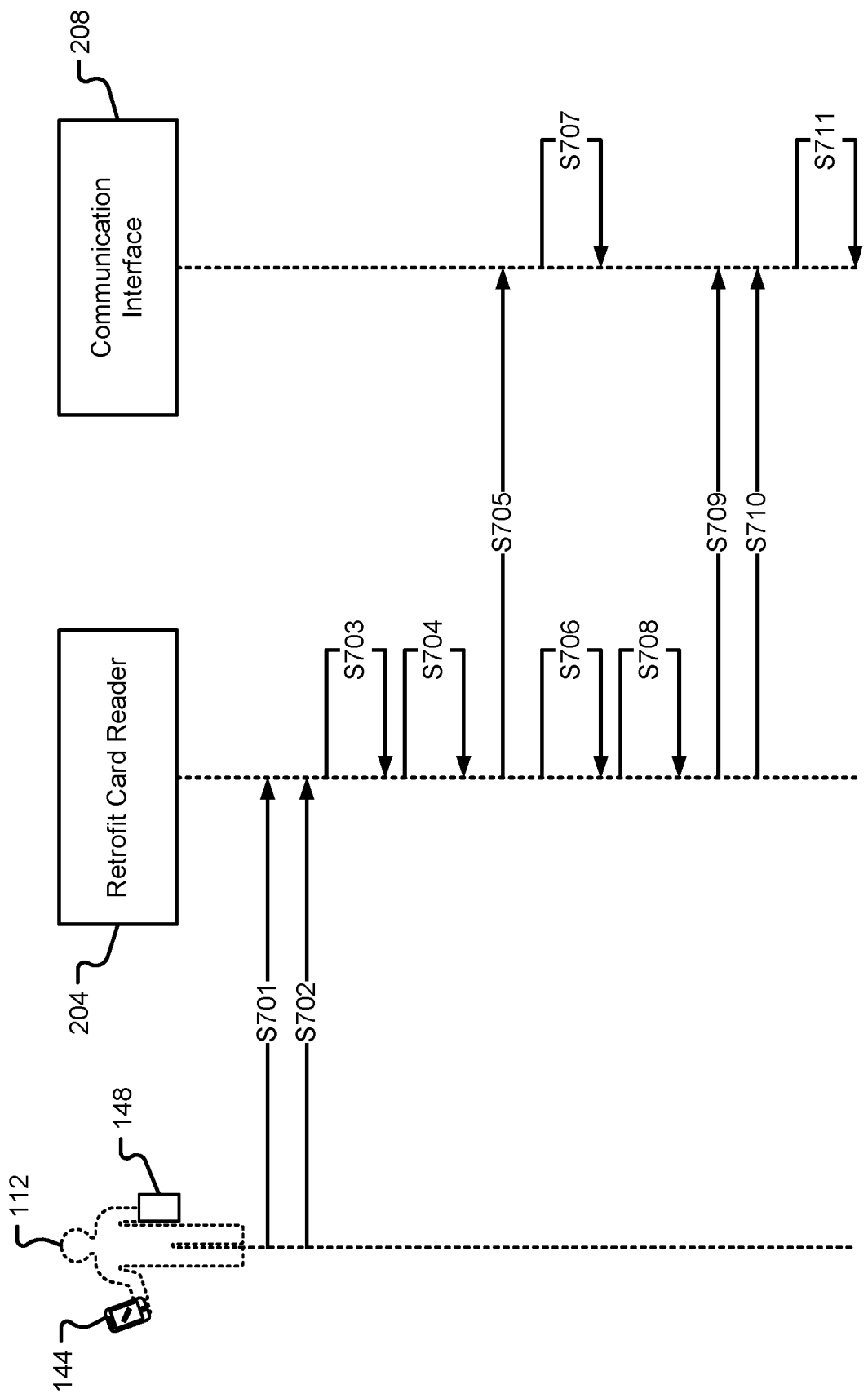
FIG. 7 is a block diagram depicting a fourth illustrative set of device interactions in accordance with embodiments of the present disclosure.

With reference now to FIG. 7, another set of device interactions will be described in accordance with at least some embodiments of the present disclosure. The device interactions depicted in FIG. 7 represent interactions that may occur when a player starts a player session with their mobile communication device 144 or contactless card 148, but then later inserts a physical card 148 to the physical card reader 216. It should be appreciated that the behavior that will be described herein can be altered, depending upon desired gaming machine 108 responses. In one embodiment, the player 112 may first present their mobile device 144 or contactless card 148 to the wireless communication module 212 to initiate a player login as described in connection with FIG. 5, for example (step S701). The method continues when the player 112 then inserts their physical card 148 into a slot of the physical card reader 216 (step S702).

In response to the insertion of the physical card 148, the retrofit card reader 204 may respond by setting a wireless front card detection state to false and/or setting a wireless rear card detection state to false (step S703). In this step, the retrofit card reader 204 is emulating an output that would be provided in response to detecting a card-out event at the physical card reader 216.

Thereafter, the retrofit card reader 204 may initiate a timer that starts counting down from a predetermined time value (step S704). The countdown value may be selected based on design considerations and should not be construed as being limited to any particular value. The timer value may start at the predetermined time value and begin counting down to zero. While the timer is counting down, the retrofit card reader 204 may communicate the card front detection state and/or card back detection state to the communication interface 208 (step S705). This may cause the communication interface 208 to initiate the process of logging the player 112 out of the current gaming session (step S707).

Meanwhile, the retrofit card reader 204 may continue monitoring the timer until it is determined that the timer has expired (step S706). In response to detecting that the timer has expired, the retrofit card reader 204 may then set the card front detection state and/or card back detection state back to true (e.g., now representing the physical insertion of the card 148 to the physical card reader 216) (step S708). The retrofit card reader 204 may then communicate the card front detection state and/or card back detection state to the communication interface 208 (step S709). This particular step may be similar or identical to step 5402. The retrofit card reader 204 may then communicate the data read from the card to the communication interface 208 (step S710). This particular step may be similar or identical to step S403.

Upon receiving the updated card state information and card data, the communication interface 208 may start the process of validating the data received from the physical card 148 and may initiate a player login process with the game management system 116 (step S711).

Figure 8:
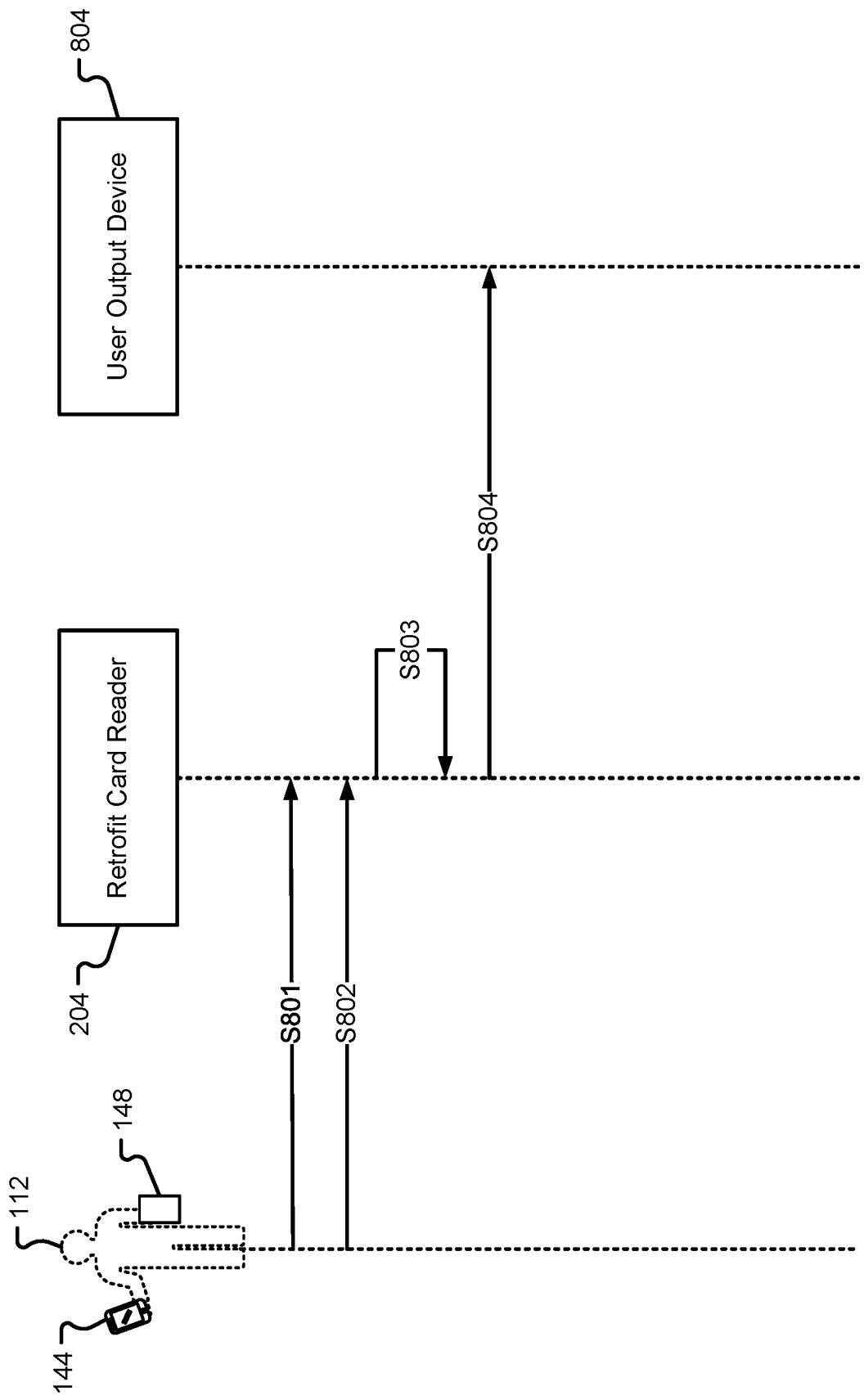
FIG. 8 is a block diagram depicting a fifth illustrative set of device interactions in accordance with embodiments of the present disclosure.

With reference now to FIG. 8, yet another set of device interactions will be described in accordance with at least some embodiments of the present disclosure. The interactions may provide a process for rejecting a physical card 148 insertion at the physical card reader 216 when a card 148 or mobile communication device 144 has already been "inserted" or presented to the retrofit card reader 204 via the wireless communication module 212. The interactions may begin when a player 112 first presents their contactless credential (e.g., mobile communication device 144 or contactless card 148) to the wireless communication module 212 and completes a login process based on the presentation of the contactless credential (step S801). The process may then continue when the player 112 inserts a physical card 148 to the physical card reader 216 (step S802).

When the retrofit card reader 204 detects the physical card insertion after a player 112 has already been logged into the game management system 116 based on a presentation of a mobile communication device 144 and/or contactless card 148, the retrofit card reader 204 may determine that the wireless communication module 212 already initiated a player login and the corresponding gaming session has not yet been discontinued (step S803). When such a determination is made, the retrofit card reader 204 may provide an electrical signal to a user output device 804 of the gaming machine 108 to indicate that the player 112 is already logged in and the physical card insertion is not being registered (step S804). This may cause the user output device 804 to produce an output for the player 112 indicating that the physical card 148 is not having data read by the physical card reader 216. The user output device 804 may correspond to a buzzer, light, set of lights, or other device that is capable of producing a user-perceivable output in response to the electrical signal received from the retrofit card reader 204.

Methods

Figure 9:
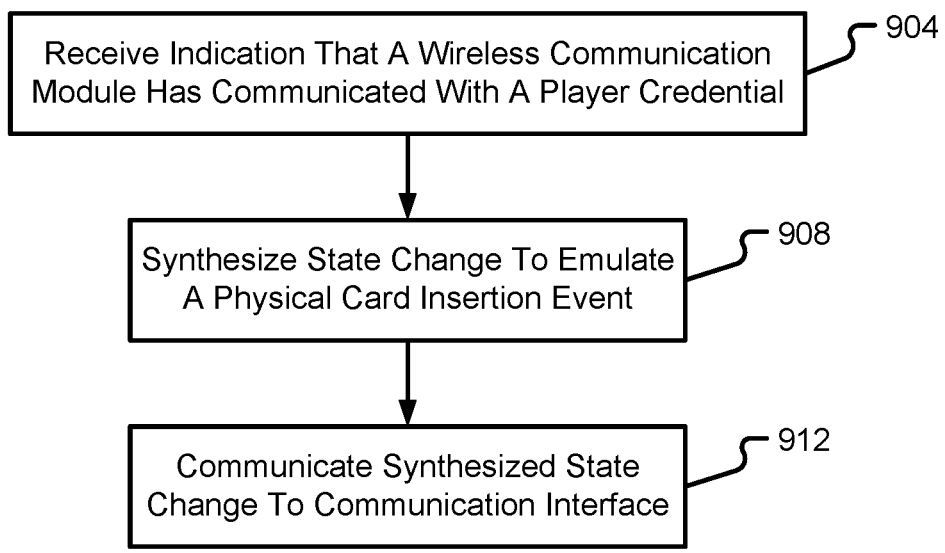
FIG. 9 is a flow diagram depicting a first method in accordance with embodiments of the present disclosure.
Figure 10:
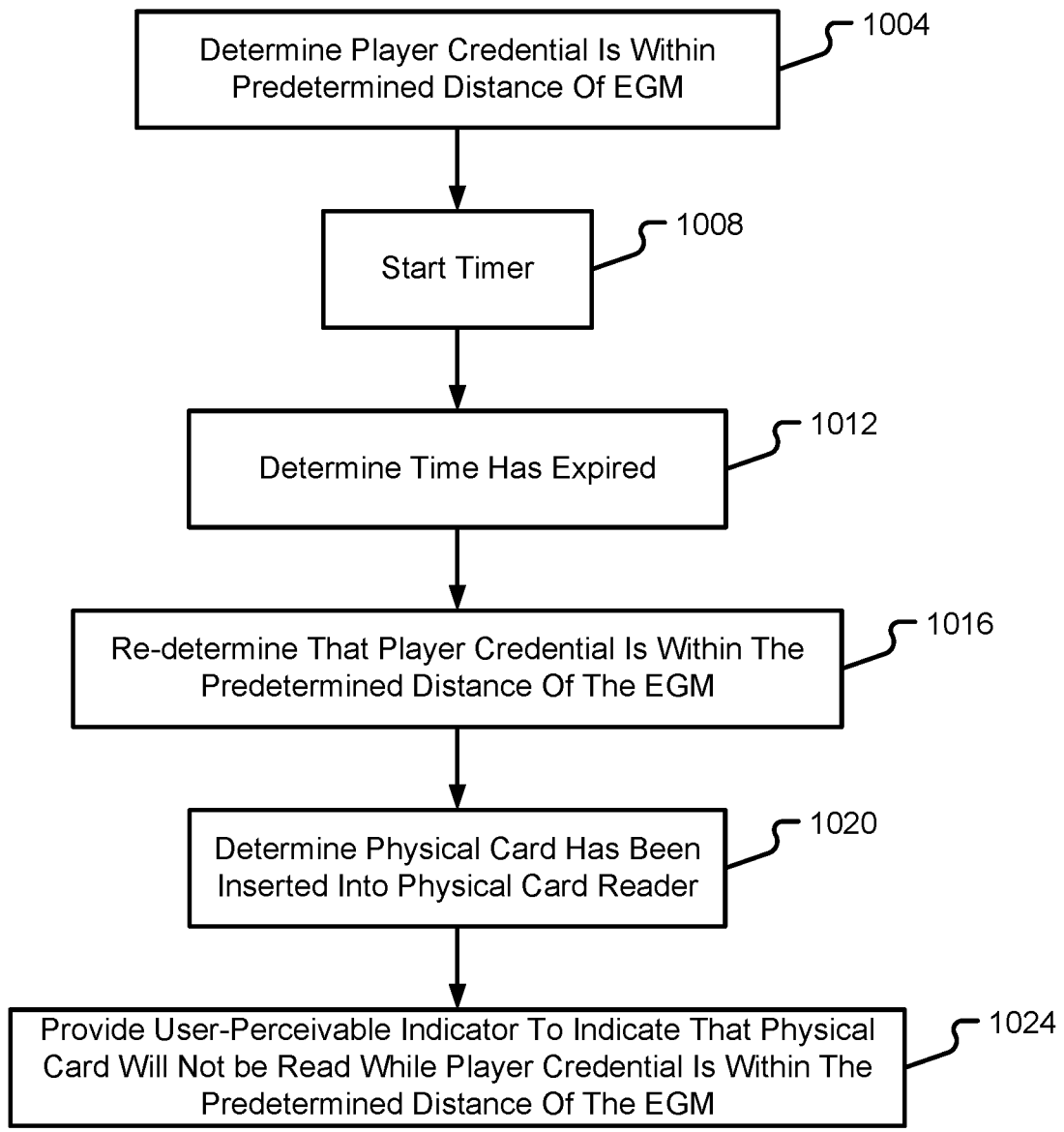
FIG. 10 is a flow diagram depicting a second method in accordance with embodiments of the present disclosure.

With reference now to FIGS. 9-10, various methods will be described in accordance with at least some embodiments of the present disclosure. It should be appreciated that the disclosed methods may be performed by one, some, or all of the devices depicted and described herein. Said another way, any device within the system 100 may be used to perform some or all of a method depicted and described herein. Moreover, although certain steps are depicted as being performed in a certain order or in connection with a particular method, it should be appreciated that any method step depicted and described herein may be performed in combination with any other method step depicted and described herein.

Referring initially to FIG. 9, a first method of enabling a player 112 interaction with a gaming machine 108 and/or game management system 116 will be described in accordance with at least some embodiments of the present disclosure. The method begins when a retrofit card reader 204 receives an indication that a wireless communication module 212 has wirelessly communicated with a player credential (step 904). In this step, the indication may be received as one or more electrical signals at a first port 236 that connects the retrofit card reader 216 with the wireless communication module 212. The electrical signals may also include data read from the player credential via the wireless communication module 212. A player credential in this situation may include a mobile communication device 144 and/or a contactless card 148 that is configured to communicate wirelessly or contactless with the wireless communication module 212. The types of communication protocols that may be used to facilitate such communications may include, without limitation, NFC, RFID, BLE, Bluetooth®, WiFi, or the like.

The method continues with the retrofit card reader 204 synthesizing a state change that emulates a physical card insertion event that would otherwise occur if a physical card 148 were inserted at a physical card reader 216 and the physical card insertion were reported to the retrofit card reader 204 via the third port 244 (step 908). The synthesized state change may be produced in response to receiving the indication of the wireless communication module 212 communicating with the player credential and/or in response to validating data read by the wireless communication module 212.

The method may then continue with the retrofit card reader 204 communicating the synthesized state change to the communication interface 208 via the second port 240 (step 912). In some embodiments, the synthesized state change may be communicated to the communication interface with one or more electrical signals that emulate a sensor state. The retrofit card reader 204 may also communicate data read from the player credential to the communication interface 212 in this step.

With reference now to FIG. 10, a second method of enabling a player 112 interaction with a gaming machine 108 and/or game management system 116 will be described in accordance with at least some embodiments of the present disclosure. The method begins by determining that a player credential is within a predetermined distance of a gaming machine 108 (step 1004). This particular determination may be made by measuring a signal strength of a wireless signal produced by the player credential and received at the wireless communication module 212. Alternatively or additionally, this determination may be made in response to detecting a position or proximity of the player 112 with respect to the gaming machine 108. Alternatively or additionally, ToF and/or distance data may be determined between the player credential and wireless communication module 212 to determine if the player 112 is maintaining player credential within the predetermined distance of the gaming machine 108.

In response to detecting the player credential is within the predetermined distance, the method continues with the retrofit card reader 204 starting a timer (step 1008). In this step, the timer may be started to countdown from a predetermined timer value.

The method will continue until the retrofit card reader determines that the timer value has expired (step 1012) and that the player credential is still within the predetermined distance prior to the timer expiring (step 1016). If the player credential is detected within the predetermined distance prior to expiration of the timer, then the timer may be reset or discontinued from counting down.

The method may further continue by determining that a physical card 148 has been inserted at the physical card reader 216 (step 1020). This determination may be made after the timer has expired, before the timer expired, before the timer was started, or in response to determining that the player credential is within the predetermined distance of the gaming machine 108. In response to detecting that the physical card 148 has been inserted at the physical card reader 216, but the player credential is still within the predetermined distance of the gaming machine 108, the method may continue by determining that the physical card 148 should not have data read therefrom. Instead, the gaming machine 108 may be made to provide the player 112 with a user-perceivable indicator to indicate that the physical card 148 will not be read while the player credential is still within the predetermined distance of the gaming machine 108 (step 1024).

The present disclosure contemplates a variety of different gaming systems and environments each having one or more of a plurality of different features, attributes, or characteristics. A "gaming system" or "gaming environment" as used herein refers to various configurations of: (a) one or more central servers, central controllers, or remote hosts; (b) one or more electronic gaming machines such as those located on a casino floor; and/or (c) one or more gaming devices, such as desktop computers, laptop computers, tablet computers or computing devices, personal digital assistants, mobile phones, and other mobile computing devices. Moreover, an Electronic Gaming Machine (EGM) as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more gaming devices in combination with one or more central servers, central controllers, or remote hosts; (c) one or more gaming devices in combination with one or more electronic gaming machines; (d) one or more gaming devices, one or more electronic gaming machines, and one or more central servers, central controllers, or remote hosts in combination with one another; (e) a single electronic gaming machine; (f) a plurality of electronic gaming machines in combination with one another; (g) a single gaming device; (h) a plurality of gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "gaming device" as used herein represents one gaming device or a plurality of gaming devices and, in some embodiments, may include an EGM or multiple EGMs. The use of "server, central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a communication network, the communication network may include a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a communication network, the communication network may include a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the communication network includes a WAN, the gaming system includes a central server, central controller, or remote host and an EGM each located in a different gaming establishment in a same geographic area, such as a same city or a same state. Gaming systems in which the communication network includes a WAN are substantially identical to gaming systems in which the communication network includes a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a communication network, the communication network may include an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A system, comprising:
   at least one sensor to detect at least one card state;
   a port in communication with a wireless communication module;
   a processor coupled with the port; and
   memory, coupled with the processor and comprising instructions stored thereon that are executable by the processor, wherein the instructions comprise instructions that when executed by the processor enable the processor to:
   receive, from the port, an indication that the wireless communication module has wirelessly communicated with a credential;
   determine a signal strength associated with a wireless signal used for the wireless communication between the credential and the wireless communication module;
   initiate a timer to determine that the credential is within a predetermined distance of the wireless communication module for at least a predetermined amount of time;
   re-determine, after the predetermined amount of time and based on the signal strength being greater than a threshold strength, that the credential is still within the predetermined distance of the wireless communication module;
   synthesize a state change that emulates an output of the at least one sensor in response to re-determining that the credential is still within the predetermined distance of the wireless communication module after the predetermined amount of time; and
   make the synthesized state change available to a communication interface in response to receiving a request from the communication interface.

2. The system of claim 1, wherein the communication interface comprises a Slot Machine Interface Board (SMIB).

3. The system of claim 2, further comprising:
   an additional port that interfaces with a physical card reader, wherein the synthesized state change simulates an output that is generated in response to a physical card being successfully inserted at the physical card reader.

4. The system of claim 3, wherein the at least one sensor comprises a first sensor and a second sensor, wherein the first sensor detects a card front, wherein the second sensor detects a card back, and wherein the synthesized state change comprises a set of electrical signals that comprise: (i) a card front detection event signal generated by the first sensor; (ii) a card back detection event signal generated by the second sensor; and (iii) a card track data signal.

5. The system of claim 4, wherein the instructions further comprise instructions that enable the processor to:
   monitor for a removal of the credential from a communication range of the wireless communication module; and
   synthesize a state change that emulates a sensor state indicating a physical card removal event in response to detecting the removal of the credential from the communication range of the wireless communication module.

6. The system of claim 5, wherein the instructions that enable the processor to synthesize the state change that emulates the sensor state indicating the physical card removal event negates the card back detection event signal generated by the second sensor.

7. The system of claim 5, wherein the instructions further comprise instructions that enable the processor to:
   instruct the SMIB to discontinue a player session in response to detecting the removal of the credential from the communication range of the wireless communication module.

8. The system of claim 1, wherein the instructions further comprise instructions that enable the processor to:
   receive an electrical signal at the port indicating the wireless communication module has registered a physical card removal event based on communications with the credential.

9. The system of claim 1, wherein the wireless communication module utilizes a proximity-based communication protocol to wirelessly communicate with the credential.

10. The system of claim 9, wherein the proximity-based communication protocol comprises Bluetooth and wherein the indication received at the port comprises Bluetooth data read from the credential along with an identifier of the credential.

11. The system of claim 1, wherein the credential comprises a mobile communication device.

12. The system of claim 1, wherein the credential comprises a contactless card.

13. A gaming machine, comprising:
    at least one sensor to detect at least one card state;
    a wireless communication module;
    a communication interface; and
    a card reader coupling the wireless communication module and the communication interface, wherein the card reader comprises:
    a processor; and
    a computer-readable storage medium, coupled with the processor and comprising instructions stored thereon that are executable by the processor, wherein the instructions comprise instructions that:
    communicate with the wireless communication module and receive an indication that the wireless communication module has wirelessly communicated with a credential;
    determine a signal strength associated with a wireless signal used for the wireless communication between the credential and the wireless communication module;
    start a timer in response to receiving the indication;
    determine that the timer has expired;
    re-determine, in response to determining that the timer has expired and based on the signal strength being greater than a threshold strength, that the credential is within a communication range of the wireless communication module;

synthesize a state change that emulates an output of the at least one sensor in response to re-determining that the credential is within the communication range of the wireless communication module after the timer has expired; and make the synthesized state change available to the communication interface in response to receiving a request from the communication interface.

14. The gaming machine of claim 13, further comprising: a physical card reader comprising the at least one sensor, wherein the instructions that synthesize the state change that emulates the output of the at least one sensor simulate an electrical output that is generated by the at least one sensor in response to a card being completely inserted at the physical card reader.

15. The gaming machine of claim 14, wherein the instructions that synthesize the state change that emulates the output of the at least one sensor further generate a plurality of electrical signals that comprise: (i) a card front detection event signal generated by a first sensor; (ii) a card back detection event signal generated by a second sensor; and (iii) a card track data signal.

16. The gaming machine of claim 14, wherein the at least one sensor comprises: a first sensor that detects a front end of a physical card completely inserted into a slot of the physical card reader; a second sensor that detects a back end of the physical card completely inserted into the slot of the physical card reader; and a data extraction component that extracts data from the physical card when the physical card is completely inserted into the slot of the physical card reader.

17. The gaming machine of claim 16, wherein the instructions further comprise instructions that:
measure a Time of Flight (ToF) of the wireless signal.

18. The gaming machine of claim 13, wherein the communication interface comprises a Slot Machine Interface Board (SMIB).

19. The gaming machine of claim 13, wherein the credential comprises a mobile communication device and wherein the wireless communication module utilizes a proximity-based communication protocol to wirelessly communicate with the mobile communication device.

20. A method, comprising:
receiving an indication that a wireless communication module has wirelessly communicated with a credential;
determining a signal strength associated with a wireless signal used for the wireless communication between the credential and the wireless communication module;
initiating a timer to determine that the credential is within a predetermined distance of the wireless communication module for at least a predetermined amount of time;
re-determining, after the predetermined amount of time and based on the signal strength being greater than a threshold strength, that the credential is still within the predetermined distance of the wireless communication module;
synthesizing a state change that emulates an electrical output of a sensor that detects a physical card insertion event in response to re-determining that the credential is still within the predetermined distance of the wireless communication module after the predetermined amount of time; and
making the synthesized state change available to a communication interface in response to receiving a request from the communication interface.

* * * * *